US00RE40341E

(19) United States
(12) Reissued Patent
Salcudean et al.

(10) Patent Number: US RE40,341 E
(45) Date of Reissued Patent: May 27, 2008

(54) CONTROLLER

(75) Inventors: Septimiu Edmund Salcudean, Vancouver (CA); Allan J. Kelley, Vancouver (CA)

(73) Assignee: Immersion Corporation, San Jose, CA (US)

(21) Appl. No.: 09/307,023

(22) Filed: May 7, 1999

Related U.S. Patent Documents

Reissue of:
(64) Patent No.: 5,790,108
Issued: Aug. 4, 1998
Appl. No.: 07/965,427
Filed: Oct. 23, 1992

(51) Int. Cl.
*G09G 5/00* (2006.01)

(52) U.S. Cl. ..... 345/184; 345/157; 715/701
(58) Field of Classification Search ..... 345/157, 345/184, 701, 156, 161, 163, 158, 166, 702; 715/701, 702; 463/37, 38, 30; 273/148 B, 273/148 R
See application file for complete search history.

(56) References Cited

U.S. PATENT DOCUMENTS

| | | | |
|---|---|---|---|
| 3,157,853 | A | 11/1964 | Hirsch |
| 3,220,121 | A | 11/1965 | Cutler |
| 3,497,668 | A | 2/1970 | Hirsch |

(Continued)

FOREIGN PATENT DOCUMENTS

| | | |
|---|---|---|
| EP | 0 085 518 A1 | 8/1983 |
| EP | 0 265 011 A1 | 4/1988 |
| EP | 0349086 | 1/1990 |
| EP | 0 607 580 A1 | 7/1994 |
| JP | S62-194389 | 12/1987 |
| JP | H4-92691 | 3/1992 |
| JP | H3-66990 | 11/1993 |
| JP | H6-210065 | 8/1994 |
| WO | WO 92/00559 | 1/1992 |

OTHER PUBLICATIONS

Computing with Feeling—Atkinson et al Computers & Graphics vol. II Jan. 1977 pp. 97–103.
Artificial Reality with Force Feedback; Development of Desktop Virtual Space with Compact Master Manipulator—Iwata—Siggraph Dallas Aug. 6–10, 1990.
Creating an Illusion of Feel:Control Issues & Force Display–Ouh–Young et al Sep. 16, 1989.

(Continued)

*Primary Examiner*—Kent Chang
(74) *Attorney, Agent, or Firm*—Kilpatrick Stockton LLP

(57) ABSTRACT

A mouse controller includes a platform mounted on a base for a range of movement in a plane relative to the base of at least ½ inch (12.5 mm) in each of two different directions (preferably mutually perpendicular directions). A pair of flat, elongated coils (Lorentz voice coils) are mounted on the platform with their longitudinal axes extending one in each of the two directions. Each of the coils cooperates with at least one magnet fixed to the base. The sizes of the magnets and of the coils and the relative positions of the cooperating coils and magnets are made or their operation controlled so that, in the range of relative movement between the platform and base, preselected forces between the coils and the magnets may be generated by a control computer. Preferably the projected area of the field from each of the permanent magnets onto the coil with which it cooperates will be substantially constant regardless of the position of the platform within the range so that the same current is required to generate the same force anywhere within the range. The control computer is programmed to activate the coils to controllably apply forces to the platform and thereby to facilitate movement of the platform and feed back tactile sensations to the operator.

54 Claims, 7 Drawing Sheets

U.S. PATENT DOCUMENTS 3,517,446 A 6/1970 Corlyon et al.
3,623,064 A 11/1971 Kagan
3,863,098 A 1/1975 Mehr ..... 315/367
3,902,687 A 9/1975 Hightower
3,903,614 A 9/1975 Diamond et al.
3,919,691 A 11/1975 Noll
4,148,014 A 4/1979 Burson ..... 340/709
4,160,508 A 7/1979 Salsbury
4,199,875 A 4/1980 Barbarasch ..... 35/12 N
4,236,325 A 12/1980 Hall et al.
4,241,519 A 12/1980 Gilson et al. ..... 434/43
4,384,338 A 5/1983 Bennett ..... 364/522
4,398,889 A 8/1983 Lam et al. ..... 434/45
4,414,984 A 11/1983 Zarudiansky ..... 128/774
4,477,043 A 10/1984 Repperger ..... 244/223
4,513,235 A 4/1985 Acklam et al.
4,538,035 A 8/1985 Pool ..... 200/6 A
4,546,347 A 10/1985 Kirsch
4,560,983 A 12/1985 Williams ..... 340/825
4,581,491 A 4/1986 Boothroyd
4,599,070 A 7/1986 Hladky et al.
4,603,284 A 7/1986 Perzley ..... 318/568
4,604,016 A 8/1986 Joyce ..... 414/7
4,632,341 A 12/1986 Repperger et al. ..... 244/230
4,692,756 A 9/1987 Clark ..... 340/709
4,706,294 A 11/1987 Ouchida ..... 381/109
4,708,656 A 11/1987 De Vries et al.
4,712,101 A 12/1987 Culver ..... 340/710
4,713,007 A 12/1987 Alban
4,734,685 A 3/1988 Watanabe ..... 340/710
4,767,923 A * 8/1988 Yuasa ..... 340/710
4,782,327 A 11/1988 Kley et al. ..... 340/365 P
4,794,384 A 12/1988 Jackson
4,794,392 A 12/1988 Selinko
4,795,296 A 1/1989 Jau ..... 414/5
4,799,055 A 1/1989 Nestler et al.
4,800,721 A 1/1989 Cemenska et al. ..... 60/393
4,823,634 A 4/1989 Culver ..... 74/471 XY
4,861,269 A 8/1989 Meenen, Jr. ..... 434/45
4,868,549 A * 9/1989 Affinito et al. ..... 345/164
4,878,183 A 10/1989 Ewart ..... 364/521
4,879,556 A 11/1989 Duimel ..... 341/20
4,891,764 A 1/1990 McIntosh
4,896,554 A 1/1990 Culver ..... 74/471 XY
4,925,312 A 5/1990 Onaga et al. ..... 364/513
4,930,770 A 6/1990 Baker
4,934,694 A 6/1990 McIntosh
4,935,728 A 6/1990 Kley ..... 340/709
4,949,119 A 8/1990 Moncrief et al. ..... 364/578
4,961,038 A 10/1990 MacMinn ..... 318/696
4,983,901 A 1/1991 Lehmer ..... 318/685
5,007,300 A 4/1991 Siva ..... 74/471 XY
5,019,761 A 5/1991 Kraft
5,022,407 A 6/1991 Horch et al.
5,035,242 A 7/1991 Franklin et al.
5,038,089 A 8/1991 Szakaly
5,044,956 A 9/1991 Behensky et al. ..... 434/45
5,065,145 A * 11/1991 Purcell ..... 340/709
5,076,517 A 12/1991 Ferranti et al. ..... 244/228
5,078,152 A 1/1992 Bond et al.
5,086,197 A * 2/1992 Liou ..... 178/18
5,086,296 A 2/1992 Clark ..... 340/709
5,095,303 A 3/1992 Clark et al. ..... 340/710
5,103,404 A 4/1992 McIntosh ..... 318/568.22
5,107,080 A 4/1992 Rosen ..... 200/6 A
5,107,262 A * 4/1992 Cadoz et al. ..... 341/27
5,113,179 A 5/1992 Scott-Jackson ..... 340/709
5,116,180 A 5/1992 Fung et al. ..... 414/5
5,125,077 A * 6/1992 Hall ..... 710/1
5,142,931 A 9/1992 Menahem ..... 74/471 XY
5,146,566 A * 9/1992 Hollis, Jr. et al. ..... 710/73
5,184,319 A 2/1993 Kramer ..... 364/806
5,185,561 A 2/1993 Good et al. ..... 318/432
5,186,629 A 2/1993 Rohen ..... 434/114
5,193,963 A 3/1993 McAffee et al. ..... 414/5
5,197,003 A 3/1993 Moncrief et al. ..... 364/410
5,203,563 A 4/1993 Loper, III ..... 273/148 B
5,209,661 A 5/1993 Hildreth et al. ..... 434/45
5,220,260 A 6/1993 Schuler ..... 318/561
5,223,776 A 6/1993 Radke et al. ..... 318/568.1
5,228,356 A 7/1993 Chuang ..... 74/471 XY
5,235,868 A 8/1993 Culver ..... 74/471 XY
5,237,327 A * 8/1993 Saitoh et al. ..... 341/176
5,264,768 A 11/1993 Gregory et al. ..... 318/561
5,275,565 A 1/1994 Moncrief ..... 434/29
5,286,203 A 2/1994 Fuller et al. ..... 434/45
5,296,846 A 3/1994 Ledley ..... 345/161
5,296,871 A 3/1994 Paley ..... 345/163
5,298,890 A 3/1994 Kanamaru et al. ..... 345/157
5,354,162 A 10/1994 Burdea et al. ..... 414/5
5,366,376 A 11/1994 Copperman et al. ..... 434/69
5,368,484 A 11/1994 Copperman et al. ..... 434/69
5,381,080 A 1/1995 Schnell et al. ..... 318/566
5,388,992 A 2/1995 Franklin et al. ..... 434/114
5,389,865 A 2/1995 Jacobus et al. ..... 318/568.11
5,414,337 A 5/1995 Schuler ..... 318/561
5,435,729 A 7/1995 Hildreth et al. ..... 434/365
5,459,382 A 10/1995 Jacobus et al. ..... 318/568.11
5,471,571 A 11/1995 Smith et al. ..... 395/137
5,559,412 A 9/1996 Schuler ..... 318/561
5,559,432 A 9/1996 Logue ..... 324/207.17
5,576,727 A 11/1996 Rosenberg et al. ..... 345/179
5,589,828 A * 12/1996 Armstrong ..... 341/20
5,629,594 A 5/1997 Jacobus et al. ..... 318/568.11
5,634,794 A 6/1997 Hildreth et al. ..... 434/37
5,691,898 A 11/1997 Rosenberg et al. ..... 364/190
5,696,537 A 12/1997 Solhjell ..... 345/164
5,701,140 A 12/1997 Rosenberg et al. ..... 345/156
5,721,566 A 2/1998 Rosenberg et al. ..... 345/161
5,734,373 A 3/1998 Rosenberg et al. ..... 345/161
5,739,811 A 4/1998 Rosenberg et al. ..... 345/161
5,757,358 A 5/1998 Osga ..... 345/146
5,767,839 A 6/1998 Rosenberg ..... 345/161
5,781,172 A 7/1998 Engel et al. ..... 345/164
5,805,140 A 9/1998 Rosenberg et al. ..... 345/161
5,831,408 A 11/1998 Jacobus et al. ..... 318/568.11
5,844,392 A 12/1998 Peurach et al. ..... 318/568.17
5,880,714 A 3/1999 Rosenberg et al. ..... 345/156
5,889,670 A 3/1999 Schuler et al. ..... 364/186
5,889,672 A 3/1999 Schuler et al. ..... 364/188
5,959,613 A 9/1999 Rosenberg et al. ..... 345/161
5,999,168 A 12/1999 Rosenberg et al. ..... 345/161
6,028,593 A 2/2000 Rosenberg et al. ..... 345/156
6,037,927 A 3/2000 Rosenberg ..... 345/156
6,046,727 A 4/2000 Rosenberg et al. ..... 345/156
6,050,718 A 4/2000 Schena et al. ..... 364/190
6,057,828 A 5/2000 Rosenberg et al. ..... 345/156
6,100,874 A 8/2000 Schena et al. ..... 345/157
6,104,158 A 8/2000 Jacobus et al. ..... 318/568.11
6,166,723 A 12/2000 Schena et al. ..... 345/184

OTHER PUBLICATIONS

NASA Technology Transfer Division—Force Feedback Control May 1990.

"Sawyer—Principle" —GS Xynetics—Design News Nov. 7, 1988.

Fischer, et al., "Specification and Design of Input Devices for Teleoperation," CH2876–1/90/0000, pp. 540–545, IEEE.

Kotoku, Tetsuo, "A Predictive Display with Force Feedback and its Application to Remote Manipulation System with Transmission Time Delay," Proc. of the IEEE/RSJ Int'l Conf. On Intelligent Robots and Systems, Jul. 1992, pp. 239–246.

Jacobsen, et al., "High Performance, High Dexterity, Force Reflective Teleoperator II," ANS Topical Mfg. On Robotics and Remote Systems, Feb. 1991, pp. 1–15.

Kotoku, et al., "Environment Modeling for the Interactive Display (EMID) Used in Telerobotic Systems," IEEE/RSJ Int'l Workshop on Intelligent Robots and Systems, Nov. 1991, pp. 999–1004.

Howe, et al., "Task Performance with a Dextrous Teleoperated Hand System," Proc. of SPIE, vol. 1883, Boston, Nov. 1992, pp. 1–9.

Adelstein, et al., "A High Performance Two Degree–of–Freedom Kinesthetic Interface," MIT, 1992, pp. 108–112.

Ouh–young, et al., "Using A Manipulator For Force Display In Molecular Docking," CH2555–1/88/0000, IEEE, pp. 1824–1829.

Winey III, Calvin McCoy, "Computer Simulated Visual and Tactile Feedback As An Aid to Manipulator and Vehicle Control," Dept. of Mech. Eng., MIT, May 1981, pp. 1–79.

Adelstein, et al., "Design and Implementation of a Force Reflecting Manipulandum for Manual Control Research," NASA–Ames Research Center, Dept. of Mech. Eng., MIT, 1992, pp. 1–26.

Russo, Massimo Andrea, "The Design and Implementation of a Three Degree–of–Freedom Force Output Joystick," Dept. of Mech. Eng., May 1990, pp. 1–33.

Bejczy, et al., "The Phantom Robot: Predictive Displays for Teleoperation with Time Delay," Jet Propulsion Lab., CH2876–1/90/0000, IEEE, pp. 546–550.

Ouh–young, Ming, "Force Display in Molecular Docking," Dept. of Computer Science, Univ. of North Carolina, 1990, pp. i–viii, 1–12, 66–85.

Hannaford, et al., "Performance Evaluation of a Six–Axis Generalized Force–Reflecting Teleoperator," IEEE Trans. On Systems, Man and Cybernetics, vol. 21, No. 3, May/Jun. 1991, pp. 620–623, 631–633.

Batter, et al., "GROPE–1: A Computer Display to the Sense of Feel," Proc. IFIP Congress 1971, pp. 759–763.

Kilpatrick, Paul Jerome, "The Use of a Kinesthetic Supplement in an Interactive Graphics System," Dept. of Computer Science, Univ. of North Carolina, 1976, pp. 1–175.

Ouh–young, et al., "Creating an Illusion of Feel: Control Issues in Force Display," Dept. of Computer Science, Univ. of North Carolina, Sep. 1989, pp. 1–14.

Iwata, H., "Artificial Reality with Force–Feedback: Development of Desktop Virtual Space with Compact Master Manipulator," 1990, Computer Graphics, vol. 24, pp. 165–170.

Wiker, S. et al., "Development of Tactile Mice for Blind Access to Computers: Importance of Stimulation Locus, Object Size, and Vibrotactile Display Resolution," Proc. of Human Factors Soc., 1991, pp. 708–712.

Atkinson et al., "Computing with Feeling, Computing & Graphics," vol. 2, 1977, pp. 97–103.

Millman et al., "Design of a Four Degree–of–Freedom Force–Reflecting Manipulandum with a Specified Force/Torque Workspace," 1991, IEEE CH2969–4, pp. 1488–1492.

Brooks Jr., et al., "Project GROPE–Haptic Displays for Scientific Visualization," 1990, Computer Graphics, vol. 24, pp. 177–185.

Minsky et al., "Feeling & Seeing: Issues in Force Display," 1990, ACM 089791–351–5, pp. 235–270.

Bostrom, M. et al., "Design of An Interactive Lumbar Puncture Simulator with Tactile Feedback," IEEE 0–7803–1363–1, 1993, pp. 280–286.

Iwata, H., "Pen Based Haptic Virtual Environment," IEEE 0–7803–1363–1, 1993, pp. 287–292.

"Foot–operated Mouse," IBM Technical Disclosure Bulletin, vol. 28, No. 11, 1986.

Rutherford, M. "Third Generation Digital Flight Controls," CAE Electronics, Ltd., The Royal Aeronautical Society, 1984 Spring Convention Future Applications and Prospects for Flight Simulation, May 9–10, 1984, paper No. 15.

De Vries, L. and Wierda, G. J., "Performance Considerations, Design Criteria and Realization of a Digital Control Loading System," International Air Transport Association, Seventh Flight Simulator Technical Sub–Committee Meeting, Agenda Item 10, Montreal, Sep. 17–20, 1984.

Baradat, Jean and Lacroix, Michel, "Advanced Features in Control Loading and Motion Systems for Simulators," National Security Industrial Association 1$^{st}$ Interservice/Industry Training Equipment Conference Proceedings, Nov. 27–29, 1981.

Norlin, Ken A., "Flight Simulation Software at NASA Dryden Flight Research Center," American Institute of Aeronautics and Astronautic's Flight Simulation Technologies Conference, Baltimore, MD, Aug. 7–10, 1995.

Corrao, Joseph M., "Control Loading," American Institute of Aeronautics and Astronautic's Flight Simulation Update 1987, Jan. 12–16, 1987.

Corrao, J.M., "Control Loading," American Institute of Aeronautics and Astronautic's Flight Simulation Update 1988, Jan. 11–15, 1988.

Rinaldi, P., "Digital Control Loading—A Modular Approach," International Air Transport Association 6$^{th}$ Meeting of the Flight Simulator Technical Sub–Committee, Montreal, Jun. 1–4, 1982.

Hildreth, Bruce L., Eyermann, Roger E. and Trankle, Thomas Dr., "DC Servo–Motors for High Performance High Reliability Control Loading in Flight Simulators," American Defense Preparedness Association 12$^{th}$ Interservice/Industry Training System Conference, Nov. 6–8, 1990.

Baigrie, Stephen A., Reflectone Inc., "Electric Control Loading—A Low Cost, High Performance Alternative," American Defense Preparedness Association 12$^{th}$ Interservice/Industry Training System Conference, Nov. 6–8, 1990.

"Digital Control Loading", Giel et al., Summary, Paper 2, Paper 3, International Air Transport Association, Seventh Flight Simulator Technical Sub–Committee Meeting, Item No. 10, Montreal, Sep. 17–20, 1984.

Seidensticker, Steve, "Application of Microcomputers to the Simulator 'Linkage' Problem," National Security Industrial Association 4$^{th}$ Interservice/Industry Training Equipment Conference Proceedings, Nov. 16–18, 1982.

Flight Simulation, Rolfe, J.M. and Staples, K. J., eds., 1986.

Albers, F. Gerry, "Microcomputer Base for Control Loading," Naval Training Equipment Center 11$^{th}$ NTEC–Industry Conference Proceedings, NAVTRAEQUIPCEN IH–306, No. 14–16, 1978.

Baigrie, "Electric Control Loading—A Low Cost, High Performance Alternative," Proceedings, pp. 247–254, Nov. 6–8, 1990.
Brooks et al., "Hand Controllers for Teleoperation—A State–of–the–Art Technology Survey and Evaluation," JPL Publication 85–11; NASA–CR–175890; N85–28559, pp. 1–84, Mar. 1, 1985.
Jones et al., "A perceptual analysis of stiffness," ISSN 0014–4819 Springer International (Springer–Verlag); Experimental Brain Research, vol. 79, No. 1, pp. 150–156, 1990.
Snow et al., "Model–X Force–Reflecting–Hand–Controller," NT Control No. MPO–17851; JPL Case No. 5348, pp. 1–4, Jun. 15, 1989.
Ouh–Young, "Force Display in Molecular Docking," Order No. 9034744, p. 1–369, 1990.
Tadros, Control System Design for a Three Degree of Freedom Virtual Environment Simulator Using Motor/Brake Pair Actuators, MIT Archive © Massachusetts Institute of Technology, pp. 1–88, Feb. 1990.
Gotow et al., "Controlled Impedance Test Apparatus for Studying Human Interpretation of Kinesthetic Feedback," WA11–11:00, pp. 332–337, Jun., 1989.
Stanley et al., "Computer Simulation of Interacting Dynamic Mechanical Systems Using Distributed Memory Parallel Processors," DSC–Vol. 42, Advances in Robotics, pp. 55–61, ASME 1992.
Russo, "Controlling Dissipative Magnetic Particle Brakes in Force Reflective Devices," DSC–Vol. 42, Advances in Robotics, pp. 63–70, ASME 1992.
Patrick et al., "Design and Testing of A Non–reactive, Fingertip, Tactile Display for Interaction with Remote Environments," Cooperative Intelligent Robotics in Space, Rui J. deFigueiredo et al., Editor, Proc. SPIE vol. 1387, pp. 215–222, 1990.
Adelstein, "A Virtual Environment System For The Study of Human Arm Tremor," Ph.D. Dissertation, Dept. of Mechanical Engineering, MIT, Jun. 1989.
Bejczy, "Sensors, Controls, and Man–Machine Interface for Advanced Teleoperation," Science, vol. 208, No. 4450, pp. 1327–1335, 1980.
Bejczy, "Generalization of Bilateral Force–Reflecting Control of Manipulators," Proceedings Of Fourth CISM–IFToMM, Sep. 8–12, 1981.
McAffee, "Teleoperator Subsystem/Telerobot Demonsdtrator: Force Reflecting Hand Controller Equipment Manual," JPL 1988.
Shimoga, "Finger Force and Touch Feedback Issues in Dexterous Telemanipulation," Proceedings of Fourth Annual Conference on Intelligent Robotic Systems for Space Exppploration, Rensselaer Polytechnic Institute, Sep. 30–Oct. 1, 1992.
IBM Technical Disclosure Bullein, "Mouse Ball–Actuating Device With Force and Tactile Feedback," vol. 32, No. 9B, Feb. 1990.
Terry et al., "Tactile Feedback In A Computer Mouse," Proceedings of Fouteenth Annual Northeast Bioengineering Conference, University of New Hampshire, Mar. 10–11, 1988.
Howe, "A Force–Reflecting Teleoperated Hand System for the Study of Tactile Sensing in Precision Manipulation," Proceedings of the 1992 IEEE International Conference on Robotics and Automation; Nice, France, May 1992.
Rabinowitz et al., "Multidimensional tactile displays: Identification of vibratory intensity, frequency, and contactor area," Journal of The Acoustical Society of America, vol. 82, No. 4, Oct. 1987.
Bejczy et al., "Kinesthetic Coupling Between Operator and Remote Manipulator," International Computer Technology Conference. The American Society of Mechanical Engineers, San Francisco, CA, Aug. 12–15, 1980.
Bejczy et al., "A Laboratory Breadboard System For Dual–Arm Teleoperation," SOAR '89 Workshop, JSC, Houston, TX, Jul. 25–27, 1989.
Bejczy, et al., "Universal Computer Control System (UCCS) For Space Telerobots," CH2413–3/87/0000/0318501.00 1987 IEEE, 1987.

* cited by examiner

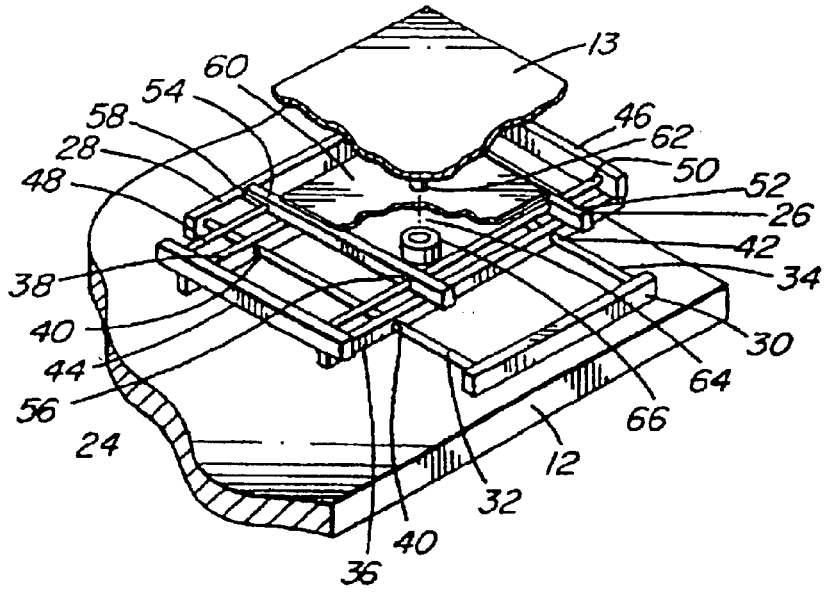
FIG. 2
FIG. 3
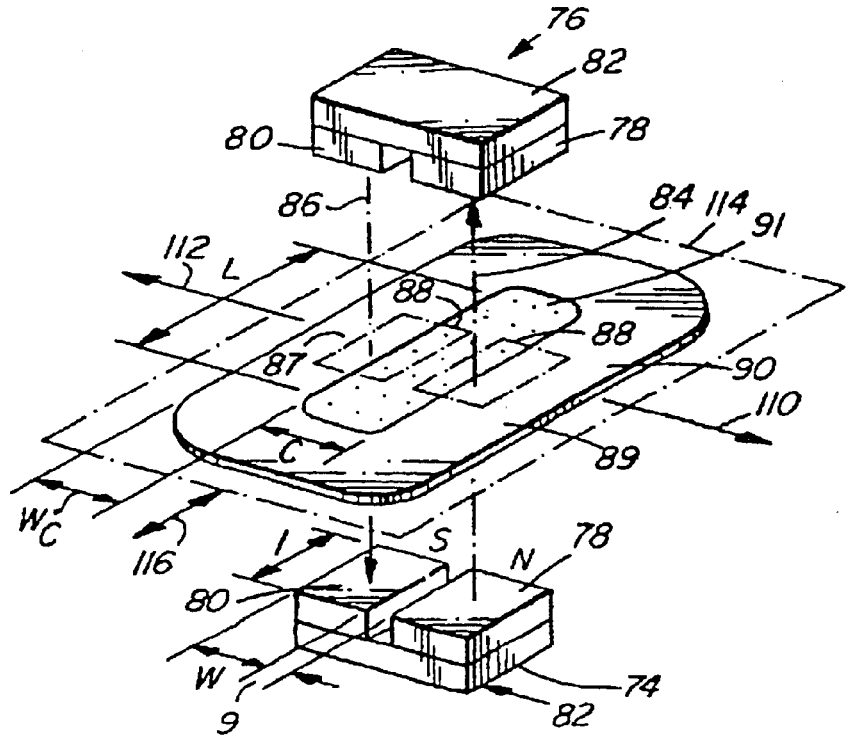

CONTROLLER

Matter enclosed in heavy brackets [ ] appears in the original patent but forms no part of this reissue specification; matter printed in italics indicates the additions made by reissue.

FIELD OF THE INVENTION

The present invention relates to a controller. More particularly the present invention relates to an electromagnetic system for the application of force feedback to the moveable platform of a controller.

BACKGROUND OF THE INVENTION

The concept of applying force feedback to a manual controller has been advanced and in fact implemented.

An article entitled Computing with Feeling by Atkinson et al in Computers and Graphics, Volume II, 1977, pp. 97 to 103, describes providing a "touchy, feely" and "touchy, twisty" to the operator so that the operator has the feel of the actions taking place. These force feedback sensations were created for molecular designs and models, etc.

A paper entitled Artificial Reality with Force Feedback; Development of Desktop Virtual Space and Compact Master Manipulator in Siggraph, Dallas, Aug. 6–10, 1990. Iwata describes a force feedback system with a human interface for manipulation of mock ups of solid objects and a paper entitled Creating an Illusion of Feel; Control Issues and Force Display, Sep. 16, 1989 Ouh-Young et al. describes the use of force feedback to create an illusion of feel. The National Aeronautics and Space Administration in an Abstract publication NASA Technology Transfer Division-Force Feedback Control May 1990 describes the use of force feedback to repel the controller and create the illusion the cursor should not cross boundaries of images, or that the cursor is attracted toward a point and to guide the operators hand in following a straight line or even along a curve.

To advance further the feedback to the operator requires control of the element manipulated by the operator, e.g. the joystick.

U.S. PAT. NO. 3,919,691 issued Nov. 11, 1975 to Noel discloses gantry mounted platform movement which is controllable in two mutually perpendicular directions by electromagnetic motors and cable or belt drives to the gantry system to impede the movement of the control platform in the two mutually perpendicular directions.

U.S. PAT. NO. 4,868,549 issued Sep. 19, 1989 to Affinito et al applies brakes to a ball in two mutually perpendicular directions. The brakes are operated by a computer to provide force feedback means to resist motion of the mouse or cursor.

BRIEF DESCRIPTION OF THE PRESENT INVENTION

It is an object of the present invention to provide a control which permits the effective application of x, y (or z) force feedback to impede or direct movement of the hand control in the x,y (or z) direction.

Broadly the present invention relates to a controller comprising a base, a platform, means for mounting said platform for a range of movement in a plane of at least ½ inches (12.5 mm) in each of two different directions, a first magnetic force applying means including a first magnet means mounted on said base and a first cooperating magnetic force generating means mounted on and moveable with said platform in position to interact with said first magnet means, a second magnetic force applying means including a second magnet means mounted on said base and a second cooperating magnetic force generating means mounted on and moveable with said platform in a position to interact with said second magnet means, said first force applying means being positioned and constructed to controllably apply selected forces to said platform in one of said two directions and said second force applying means being constructed and positioned to controllable apply selected forces to said platform in the other of said two directions and control means to selectively control said first and said second force applying means to generate said selected forces.

Preferably said two directions will be mutually perpendicular.

Preferably said controller will further comprise a sensor means for sensing the position of said platform relative to said base.

More preferably said sensor means will comprise a transparent grid mounted on and moveable with said platform and a light source and a detector means fixed relative to said base in positions wherein light from said source passes through said grid and is detected by said detector means Preferably said first cooperating magnet force generating means including a first coil means position to interact with said first magnet means when a current is applied to said first coil means, and said second magnetic force generating means including a second cooperating coil means in a position to interact with said second magnet means when a current is applied to said second coil means, said first magnet means and said first cooperating coil means of said first force applying means being shaped and positioned so that in any position of said platform within said range said coil may be controlled to apply said selected force between each of said first and second cooperating coil means and its respective magnet means and wherein said control means selectively applies current to said first and said second cooperating coil means to generate said selected forces.

It is also preferred that the projected area of a field generated by said first magnet means onto said first cooperating coil means is substantially constant so that the application of a selected current to said first cooperating coil means generates the same force between said first magnet means and said first cooperating coil means regardless of the position of said platform within said range of movement, said second magnet means and said second cooperating coil means of said second force applying means being shaped and positioned so that in any position of said platform within said range the projected area of a field generated by said second magnet means onto said second cooperating coil means is substantially constant so that the application of a selected current to said second cooperating coil means generates the same force between said second magnet means and said second cooperating coil means regardless of the position of said platform within said range.

Preferably said first cooperating coil means will comprise a first elongated substantially planar coil having its major axis extending substantially parallel to said plane and to one of said pair of mutually perpendicular directions and said second cooperating coil means will comprise a second elongated substantially planar coil having its major axis substantially parallel to said plane and said other of said mutually perpendicular directions.

Preferably said first magnet means and said second magnet means each will comprise a pair of permanent magnet means, one permanent magnet means of each said pair located on one side of its said cooperating coil means and the other permanent magnet means of each said pair of permanent magnet means located on the side of its said cooperating coil means opposite its respective said one permanent magnet means.

Preferably each said permanent magnet means is configured with with its magnetic poles facing in opposite directions and with their polar axes substantially parallel to the plane of said planar coils.

More preferably said polar axis of each said permanent magnet means is substantially parallel to said major axis of its respective cooperating planar coil.

Preferably said means for mounting will comprise gantry means

BRIEF DESCRIPTION OF THE DRAWINGS

Further features, objects and advantages will be evident from the following detailed description of the preferred embodiments of the present invention taken in conjunction with the accompanying drawings in which:

FIG. 2 is an exploded view illustrating how the platform is mounted.

FIG. 3 is an exploded view of one pair of cooperating magnets and cooperating coil.

DESCRIPTION OF THE PREFERRED EMBODIMENTS

Figure 1:
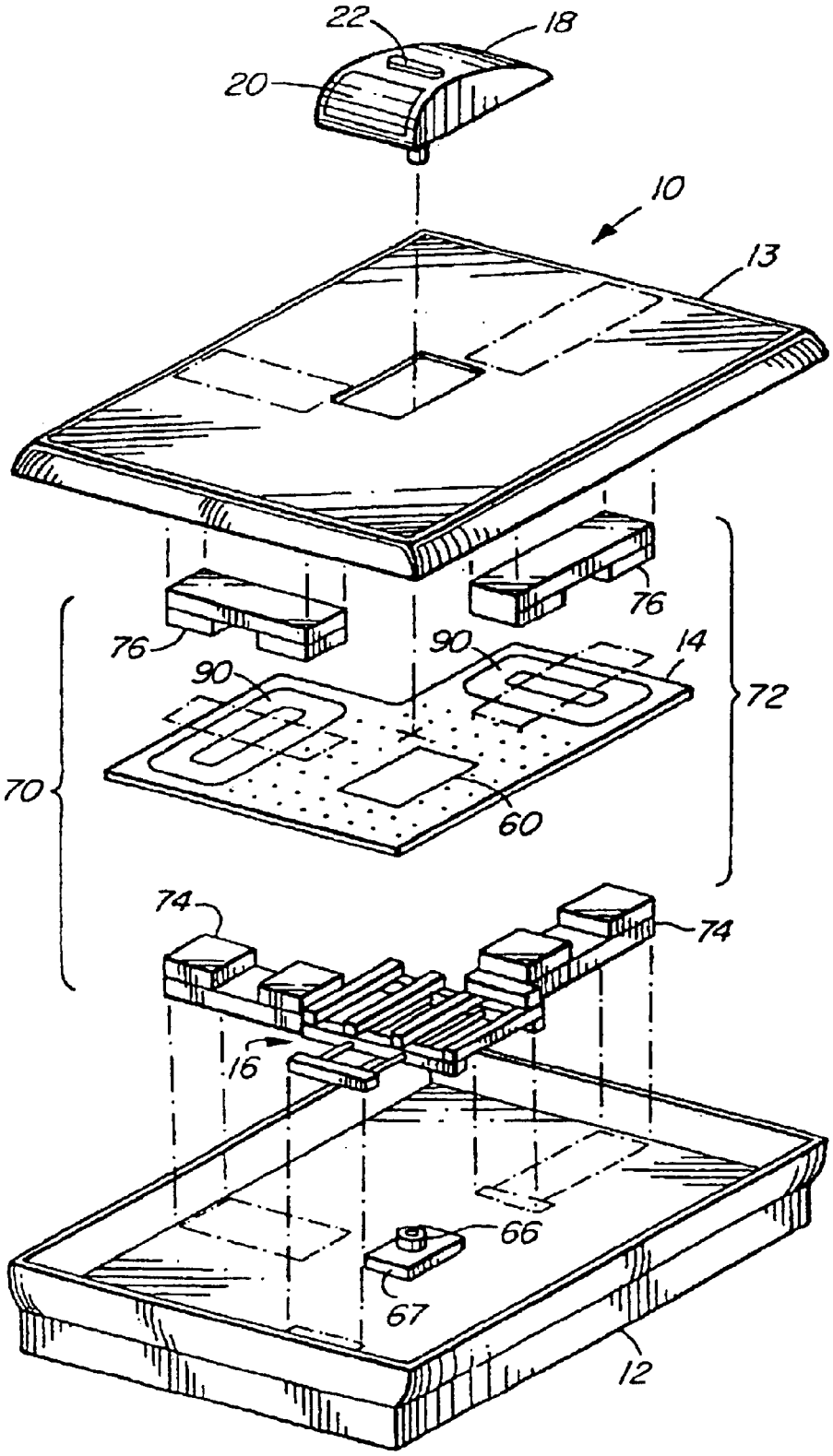
FIG. 1 is an exploded schematic illustration of the main component of the controller of the present invention.

The controller 10 illustrated in FIG. 1 includes a base element 12 and a cover 13 between which a platform 14 is mounted on a mounting system 16 that may take any suitable form, and in the illustrated embodiment is in the form of a gantry system 16 mounting the platform 14 from the base 12. The mounting system 16 permits of the platform 14 to move in two mutually perpendicular directions (as will be described in more detail hereinbelow).

A suitable controller or handle 18 having a push button switch 20 (used in a conventional manner of a typical mouse) is mounted on the platform 14.

The controller or handle 18 may also be provided with a tactile system which through movement of the tactile feedback element 22 may be used to apply pressure to the operator or used tin reverse to control an operation (as will be described hereinbelow).

The gantry 16 is more clearly indicated in the exploded view of FIG. 2. As illustrated it comprises a pair of similar one degree of freedom sliding frame units 24 and 26. The first frame unit 24 consists of parallel mounting bars 28 and 30 fixed to the base 12 and a pair of parallel rods 32 and 34 extending between and perpendicular to the mounting 28 and 30. A pair of spaced substantially parallel bars 36 and 38 extend substantially to and are slidable mounted on the rods 32 and 34 via guiding aperture 40 and 42 to permit the bars 36 and 38 to slide therealong.

The bars 36 and 38 of the first frame element 24 are held in spaced relationship by a pair of end mounting bar 44 and 46 which act in the same manner as the bars 28 and 30 but to mount a second pair of parallel mounting rods 48 and 50 oriented substantially perpendicular to the rods 32 and 34.

These rods 48 and 50 mount a second pair of parallel bars 52 and 54 similar to the bars 36 and 38 and provided with guiding holes 56 and 58 for movement of the bars 52 and 54 along the rods 48 and 50 so that the second frame unit 26 slides in the direction perpendicular to the direction in which the first frame unit 24 slides. The platform 14 is mounted on the second frame 26, i.e. is fixed to the bar 52 and 54.

The exploded view of FIG. 2 will also be used to explain the operation of the position sensor which determines the position of the platform' 14 relative to the base 12. In the FIG. 2 illustration the position of the platform 14 is determined using the grid or mesh 60 of mutually perpendicular uniformly spaced lines that influence the transmission of light through the grid in a manner different from the spaces between the lines. The lines of the grid 60 are preferably oriented so that one set of parallel lines is parallel to the rods 32 and 34 and the other set is parallel to the rods 54 and 56. The grid 60 is the operative part of the platform 14 required to determine position.

Fixed to the top cover 13 is a suitable light source 62 which projects a beam of light 64 through the grid 60 onto a detector 66 fixed to the base 12. It will be evident that as the grid 60 is moved with the platform 14, each element (line) of the grid disrupts the light beam 64 as that element (line) traverses the beam 64. The disruption is sensed by the optical detector 66 which detects movements in the two mutually perpendicular directions.

The detector system or position detecting system described above may be replaced by any other suitable position detector.

The force applying actuators 70 or 72 (of FIG. 1) are essentially the same but are oriented in the controller 10 in mutually perpendicular relationship to the other. These actuators 70 and 72 control force applied to the platform 14. Each is composed of a pair of permanent magnets 74 and 76 fixed to the base 12 and cover 13 respectively and a flat or planer coil 90 mounted on the platform 14 and interposed between the fixed magnets 74 and 76. The actuators 70 and 72 are constructed essentially the same and thus like reference numerals have been used to illustrate like parts of the respective actuators 70 and 72.

The stationary magnet assemblies 74 and 76 are each composed of a pair of permanent magnets 78 and 80 mounted on a return plate 82 which magnetically interconnects the magnet 78 and 80.

In the arrangement illustrated in FIG. 3, the magnetic field between the corresponding magnets 78 of each pair of stationary magnets 74 and 76 in each of the actuators 70 and 72 extends as indicated at 84 (upward in FIG. 3) while field between the corresponding magnets 80 of each pair of stationary magnets 74 and 76 in each of the actuators 70 and 72 extend in the opposite direction as indicated at 86 (downward).

Figure 4:
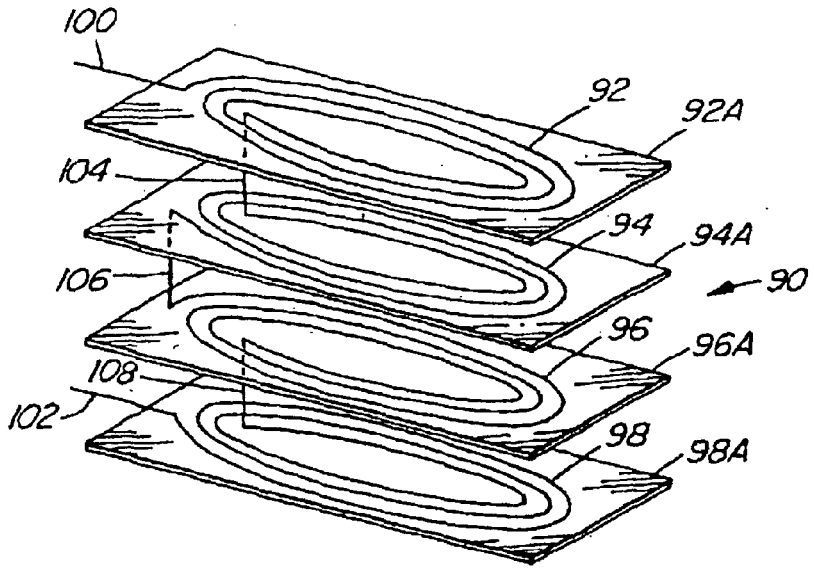
FIG. 4 is an exploded view of multi-layered planar actuator coil forming the electromagnet.

Each of the actuators 70 and 72 includes an actuator coil 90 (eg. a Lorentz voice coil) mounted on-with the platform in a position to cooperates with the magnet 74 and 76, of its respective actuator 70 and 72. The coil(s) 90 as schematically illustrated in FIG. 4 is formed by interconnected coil winding 92, 94, 96 and 98 (only 4 shown) each embedded in its own coil plate 92A, 94A, 96A, and 98A respectively. Electrical power may selectively be introduced to the outer turns of the upper and lower windings 92 and 98 as indicated by the leads 100 and 102 and the windings are electrically interconnected via jumpers 104, 106, 108. The jumper 104 connects the inner turn of winding 92 with the inner turn of winding 94, the jumper 106 connects the outer turn of winding 94 with the outer turn, of winding 94 and the jumper 108 interconnects the inner turn of winding 96 with the inner turn of winding 98 so that the current travels in the same direction around each of the windings 92, 94, 96 and 98 and generates reinforcing lines of flux. The windings, shown in the exploded view of FIG. 5 could be manufactured directly on a printed circuit board which would obviously also serve as coil plate. If necessary a multi-layered print circuit board that could be used to increase the amount of current.

In a particular example of the actuator coil constructed as shown in FIG. 3 the coil 90 had a thickness of approximately 2.5mm and there was a clearance of approximately 1.25mm between the coil 90 and each of the magnets 74 and 76 (it is preferred to make the clearance smaller than this i.e. as small as possible or practical). The width W of each of the magnets 78 and 80 of this specific example were about 17mm while the gap G between the two magnets 78 and 80 was about 3mm so that the total width of the magnet 74 and 76 was 37mm.

The width $W_c$ of each side 87 and 89 on opposite sides of the core 91 of the wound coil 90 in the example shown in FIG. 3 was 17mm and the length of the opening as indicated by the dimension L was 48mm to accommodate the axial displacement of the coil 90, i.e perpendicular at the arrows 110 and 112 which indicate the direction of force applied when the coil 90 is active by current flow in one direction or the other as will be described below.

The widths W and $W_c$ and the width of the core 91 are coordinated to ensure that at all times the total projected area of the permanent magnets 78 and 80 onto the coil 90 remains constant over the range of movement of the coil 90 which is depicted by the dotted line 114.

The size of the coils 90 particularly their longitudinal axes have a significant influence on the range of movement of the platform 14 relative to the based. This range preferably will be at least ½ inch (12.5mm) in each of the two mutually perpendicular directions and preferably at least 1 inch (25mm) in each of those directions.

Figure 5:
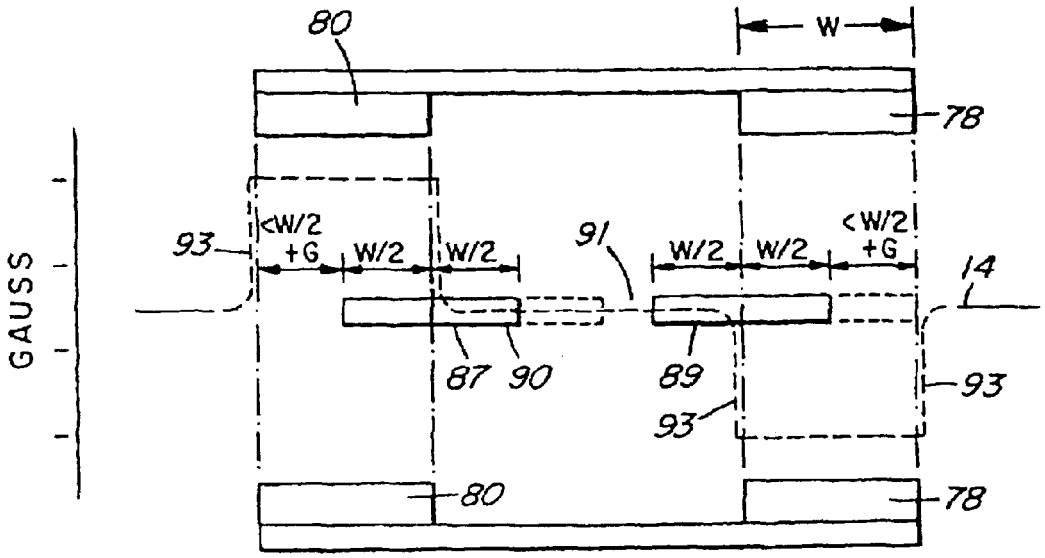
FIG. 5 a schematic exploded illustration of the permanent magnetic the cooperating coil with the plot of field strength of the permanent magnets applied thereto.

FIG. 5 illustrates the electromagnetic field that will be generated by each of the magnet 74 and 76 measured in the plane of the coil 90 mounted on the platform 14.

The width W of the permanent magnet 80 will be the same for each of the magnets 80 and for the magnets 78 and the spacing G therebetween will also be the same, but may be selected differently depending on how actuator coil 90 mounted on the platform 14 is constructed. The dimensions of the coil 90, i.e. width $W_C$ and length L as above indicated define the permitted movement of the platform 14. In the arrangement illustrated in FIG. 3, in the neutral position, i.e. the position where the light beam 64 is in the centre of the grid 60, the magnets 78 and 80 are positioned as indicated in dotted lines at 88, in the centre of the coil 90 with half (½) of the projected area of each of the magnets 78 and 80 overlapping respectively with sides 87 and 89 of the coil 90.

It will be apparent that in this position if the platform is moved in the directions of the 110 or 112 the same amount of one of the projected areas moves from overlapping with the coil 90 into the core space 91 that moves from the space 91 into the coil 90 and that movement in the axial direction of the coil 90 does not change the relative amount of area directly subjected to the magnetic field of the permanent magnets 78 and 80.

Thus a given current through the coil 90 in one direction develops the same force regardless of the position of the platform within its range of movement. If the platform is moved so that the projections 88 extend beyond the length L in either direction, the total force generated between the coil 90 and the magnets 74 and 76 will not remain constant.

For the illustration in FIG. 3 the gap G is relatively narrow and the width of the core 91 of the coil 90 is relatively wide since the magnets 78 and 80 project into the core 91. In an alternative arrangement as illustrated in FIG. 1 the magnets 78 and 80 have been spaced farther, i.e. the gap G has increased dramatically so that half of magnet 78 project outside of the coil 90 as does half of the magnet 80. The arrangement of FIG. 1 and 5 is preferred as it permits using a narrower coil 90.

The width of the coil as indicated at $W_c$ defines the amount of movement that can be accommodated in the direction of the arrows 110 and 112 while maintaining the constant force application for a given current. In the FIG. 3 arrangement the effective maximum width $W_c$ of each side of the coil 90 should not exceed.

$$W_c(MAX)=W+G$$

as if this width is exceeded movement of the platform in the directions 110 or 112 might result in more projected area of the magnets 78 and 80 onto the coil 90.

FIG. 5 shows the magnetic field form the permanent magnets 78 and 80 via the dash line 93, it being a maximum directly between the aligned magnets 78 or 80.

In operation with a given current i in the conductor of the coil 90 with a differential element length dl, a differential force dF will be exerted on the conductor when crossed by the magnetic field B generated by the magnet 74 and 76. The mathematical relationship is $$dF=i\ dl\times B.$$

By integrating over the portions of the coil 90 that intersect the effective flux areas of the permanent magnets 74 and 76, a total force F is seen to act along one axis with its orientation dictated by the direction of the current. It follows that the x and y direction actuation forces on the coil 90 can be controlled by two independent, bi-directional currents. An embedded micro-controller 67 (see FIG. 1) may be used for controlling the motion sensing and force actuation of the system. This micro-controller determines the movement of the platform as above described by the interruption of the beam 64 by the line grid. When motion is detected, the micro-controller 67 sends the appropriate information packet through a connection to the computer's mouse port where it is interpreted by that system's mouse driver in the same way as it would for a common mouse.

After calculating the position of the platform 14, the micro-controller's control program also calculates any necessary feedback forces and causes their actuation by turning on current drivers that excite one or both of the x and/or y direction coils 90.

While it is preferred to construct the platform 14, coils 90 and permanent magnets 47 and 76 as above described so that anywhere within the normal range of movement of the platform 14 a given current to the coils 90 imparts the same force to the platform 14 in the selected direction, it is also possible to construct the coils 90 and magnets 74 and 76 so that the same projected area of the permanent magnets 74 and 76 onto the coils 90 does not occur throughout the complete range of movement of the platform 14 relative to the base 12 and to vary the current applied to the coils 90 based on the relative position of each of the coils 90 with its respective permanent magnets 74 and 76 so that the current will be adjusted to generate the desired force by applying a current that will obtain that desired force at that relative positioning of the coil 90 and its respective magnets 74 and 76. Depending on the shape and size of the coils 90 this may require active adjustment (for example on the basis of lookup tables) based on limited movements of the platform 14 relative to the base 12 and for that reason for previously described arrangement permitting the use of a constant current for a given force anywhere within the normal range of relatively movement between the platform 14 and the base 12 is preferred.

Figure 6:
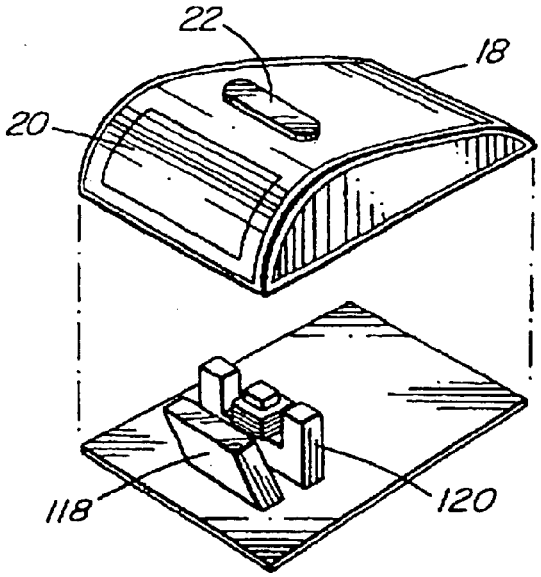
FIG. 6 is an exploded view of the handle which may be used with a mouse of the present invention.

The mouse handle 18 is shown in exploded view in FIG. 6 and includes as above described an actuator button 20 and a tactile element 22. The button 20 actuates a micro switch 118 while the tactile element 22 is controlled by an E-core type magnet 122 with a coil as schematically indicated at 124.

Figure 7:
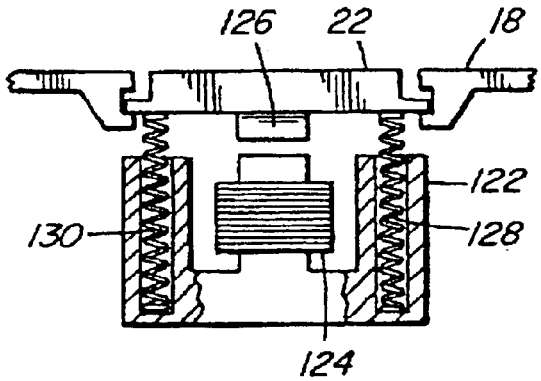
FIG. 7 is a section through the handle of FIG. 6 illustrating the construction of the actuator for the tactile element.

The structure of the tactile element is more clearly shown in FIG. 7 and includes an E-core magnet 122 with a coil 124 wrapped around its inner leg which is positioned to cooperate with a permanent magnet 126 mounted on the tactile element 22.

A pair of springs 128 and 130 tend to hold the tactile element in its lower most position as illustrated i.e. closest to the core 122, however when the coil is activated the repulsion of the magnet 126 from the core 122 and the coil 124 is stronger than the tension in the springs 128 and 130 so that the tactile element moves upwardly away from the core 122 with the amount of movement being dependent on the current in the coil 124.

The position of the tactile element 22 is such that it contacts with the hand of the user and when activated applies pressure thereagainst, the pressure being proportional to the amount of current passing through the coil 124.

Figure 8:
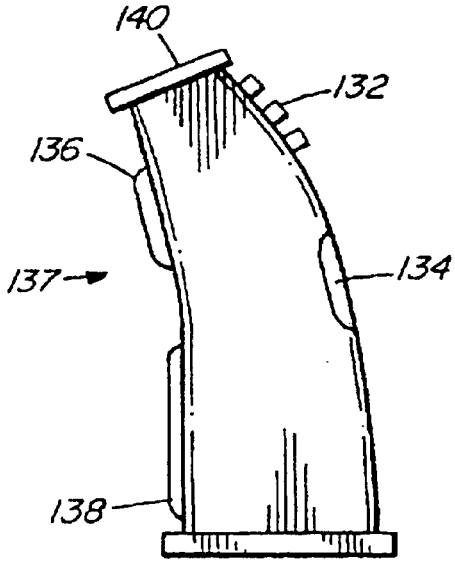
FIG. 8 is a schematic illustration of a hand controller or joystick that may be used in place of the control button of the controller.

Other types of handles may be used if desired, for example, the control handle 131 in FIG. 8, which takes the form of a joystick control may also be used and may be provided with further controller buttons as schematically indicated at 132 and further tactile elements as indicated at 134, 136 and 138 on the joystick 140. Tactile elements may be operated in a similar manner to the tactile element 22 described above and the control elements 132 may take the form of pressure switches or the like.

In the event a controller for controlling three degrees of freedom is required, the handle 18 or 140 may be replaced by or modified to provide z axis control, for example instead of the tactile element 22 functioning as a tactile element it could be used as a z controller by providing a suitable position sensor to sense the position of the element 22 when it is displaced from a rest position or alternatively as a bi-stable switch for limited z direction control.

Figure 9:
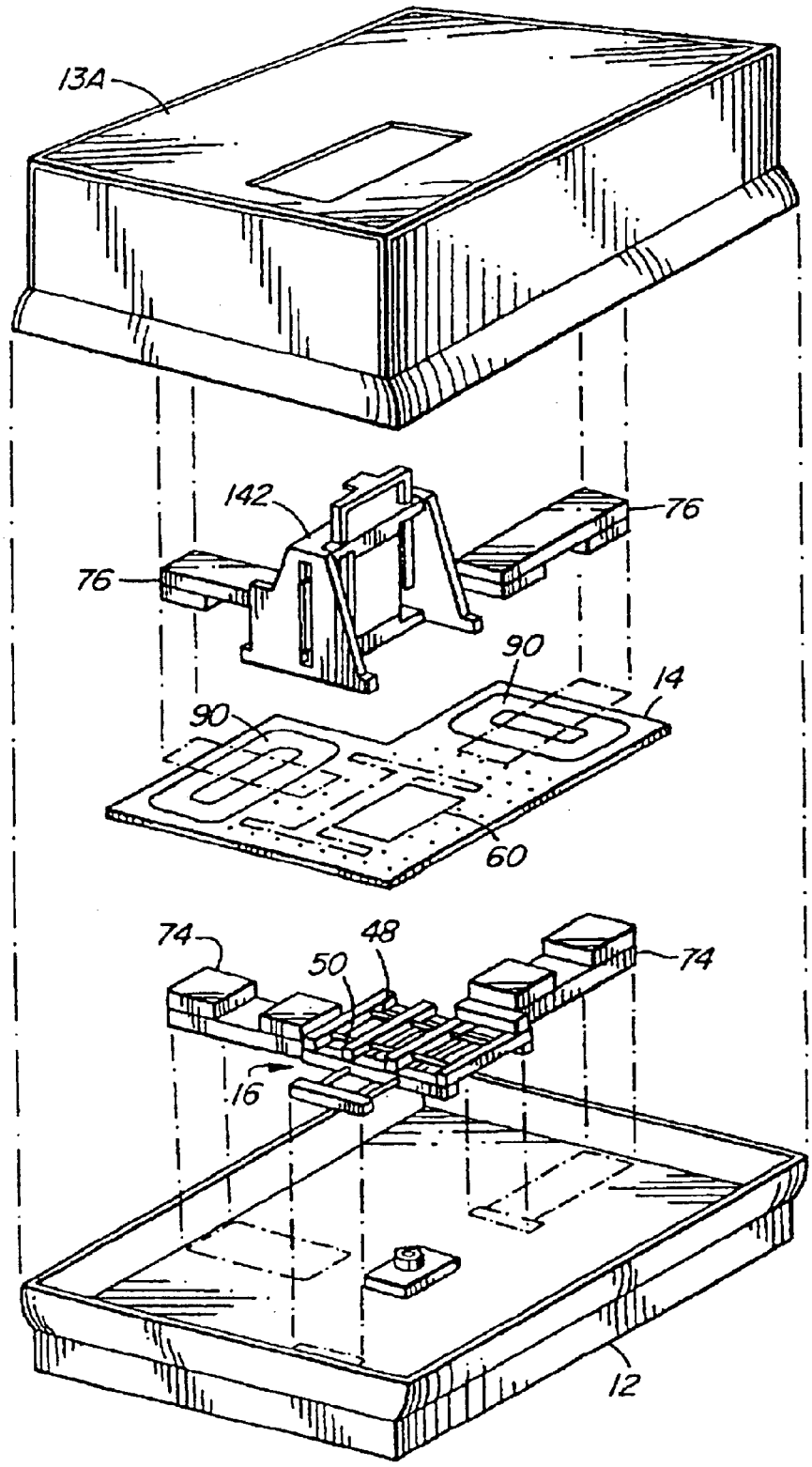
FIG. 9 is an exploded view similar to FIG. 1 but illustrating the incorporation of a z direction controller.
Figure 10:
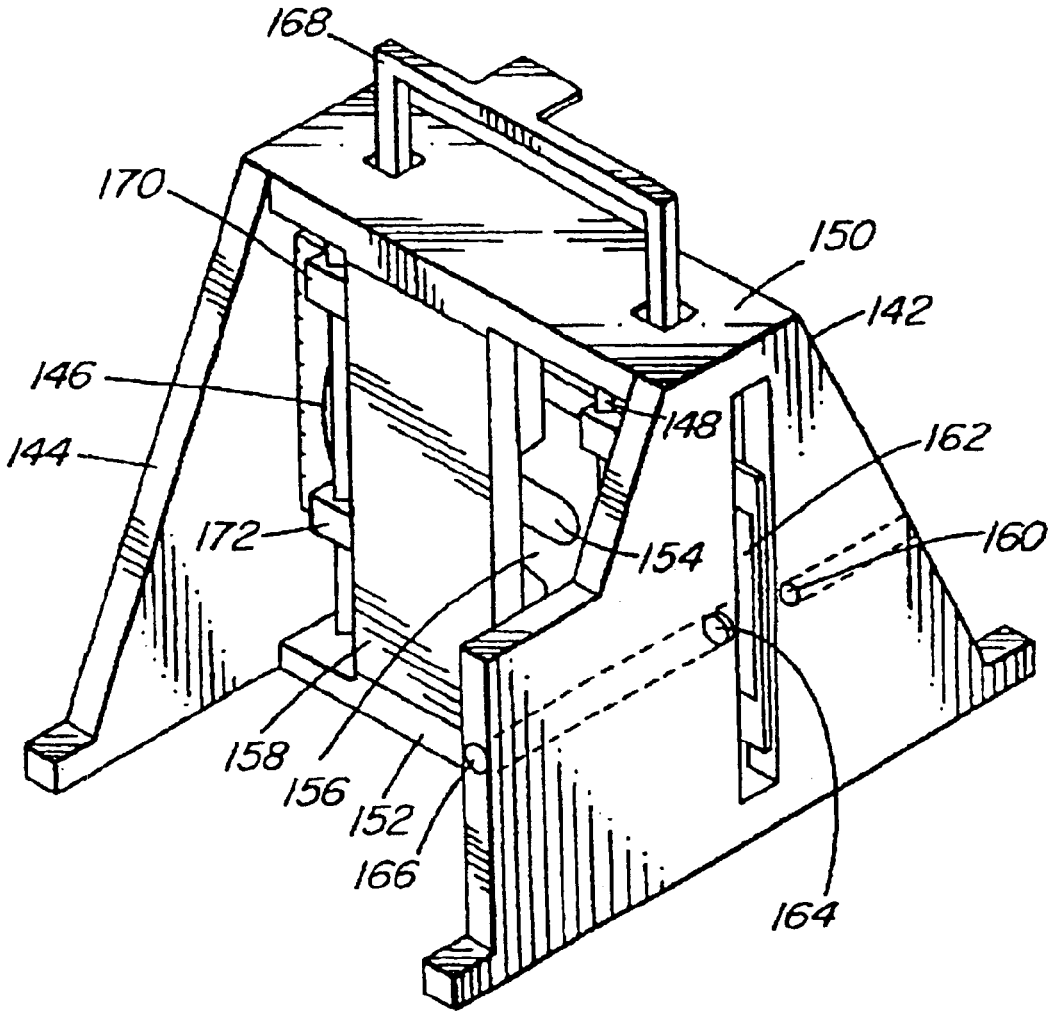
FIG. 10 is an isometric illustration of the z controller.

A z direction controller 142 is illustrated in FIG. 9. This controller 142 is fixed to the platform 14 enclosed by a top 13A replacing and similar to the top 13 but modified to accommodate the z direction controller 142.

In the embodiment illustrated in FIG. 9, like reference numerals have been used to indicate like parts of those in FIG. 1.

The configuration of the coil 90 and of the permanent magnet 74 and 76 in FIGS. 1 and 9 are significantly different, in the FIG. 9 arrangement the permanent magnets in neutral position project to the outside of the sides 87 and 89 while in FIG. 3 they were on the inside.

The z direction controller 142 is composed of a frame 144 which is fixed to the platform 14. Mounted to the frame 144 are parallel rods 146 and 148 fixed at their upper ends to the bar 150 and their bottom ends to the cross base 152. The rods 146 and 148 are perpendicular to the rods 32,34,36 and 38. A platform 154 on which is mounted a coil plate 156 similar to the coil plate 90 described hereinabove is slidable mounted on the rods 146 and 148 via bars 170 and 172 with suitable opening to receive the rods 146 and 148 (similar to the manner in which the platform 14 is mounted).

The coil plate 156 cooperates with a pair of permanent magnets 158 (only one shown) equivalent to the permanent magnets 74 and 76 described hereinabove.

An LED or other light source 160 projects light through encoding 162 which is provided with a plurality of uniformly spaced horizontal lines between which the light from the source 160 projects so that movement of these lines disrupts the light from the source 160. Light passing through the grid or encoder 162 is focused via lens 164 onto sensor or photo detector 166 which generates a signal substantially in the same manner as the encoder 66 and 67 for the platform 14.

The platform 154 is provided with a handle 168 moveable in the z direction on the rod 146 and 148 and is used to manipulate the platform 14.

Figure 11:
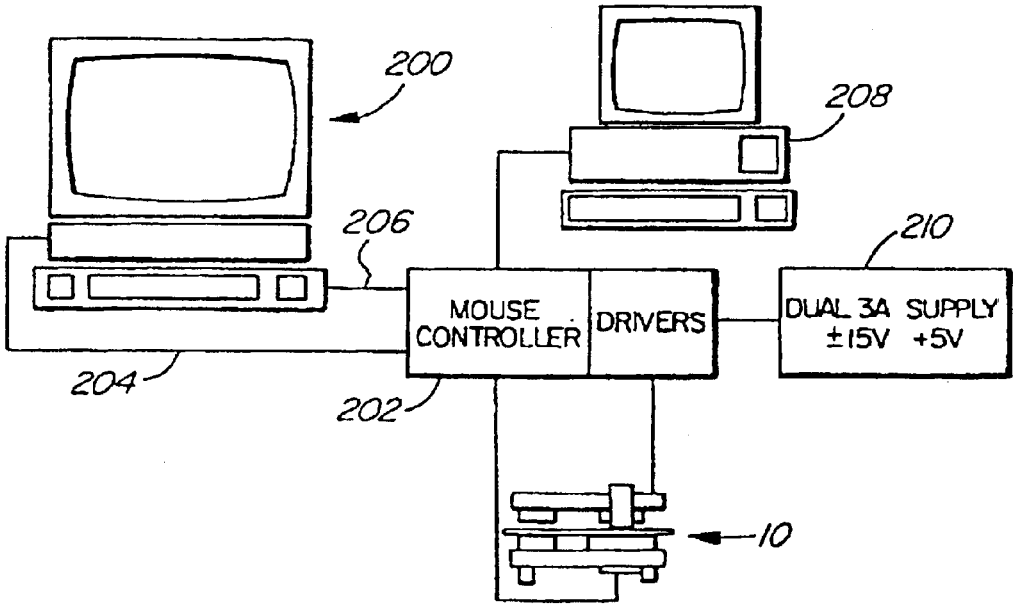
FIG. 11 is a schematic illustration of the control system of the present invention.

Force feedback is applied to the handle 18, 140 or 168 is generated by programming a computer. For demonstration purposes the configuration shown in FIG. 11 was used wherein a first display station computer 200 was interconnected with a mouse controller 202 by two lines of serial communication 204 and 206 respective specifically a connection to the mouse port for supplying the work station with mouse motion data and a connection from a serial port for receiving commands and screen information from the work station.

A second computer 206 was connected to the mouse controller 202 and was used as a monitor for loading new code into memory on the controller board. A suitable power supply 210 provides power to the driver 212 for the controller 10.

The software is running on both the computers 200 and 208 so the responsibilities of the two units must be properly divided.

Preferably the mouse 202 will send movement and button status data to the computer 200 where software calculates the desired forces for that particular pointer location and sends that force information to the micro controller which in turn drives the coils 90, 124 and 156 as required. However, this requires a very high powered computer and therefore to simplify to permit operation with the equipment available the computer 200 responsibilities were limited to handling the usual x window events, process input to maintain graphic interface and to initiate a synchronous transmission of non-real time commands to the micro controller when necessary. The micro controller is given the responsibility of doing the mouse position sensing to control movement and the transmission of mouse status data to the host mouse port and at the same time respond to commands from the host 200 and store in memory the locations of icon, windows, buttons, etc. that are activated on the display and to interactively calculate the necessary feedback forces with respect to pointer or curser positions during control movements.

Figure 12:
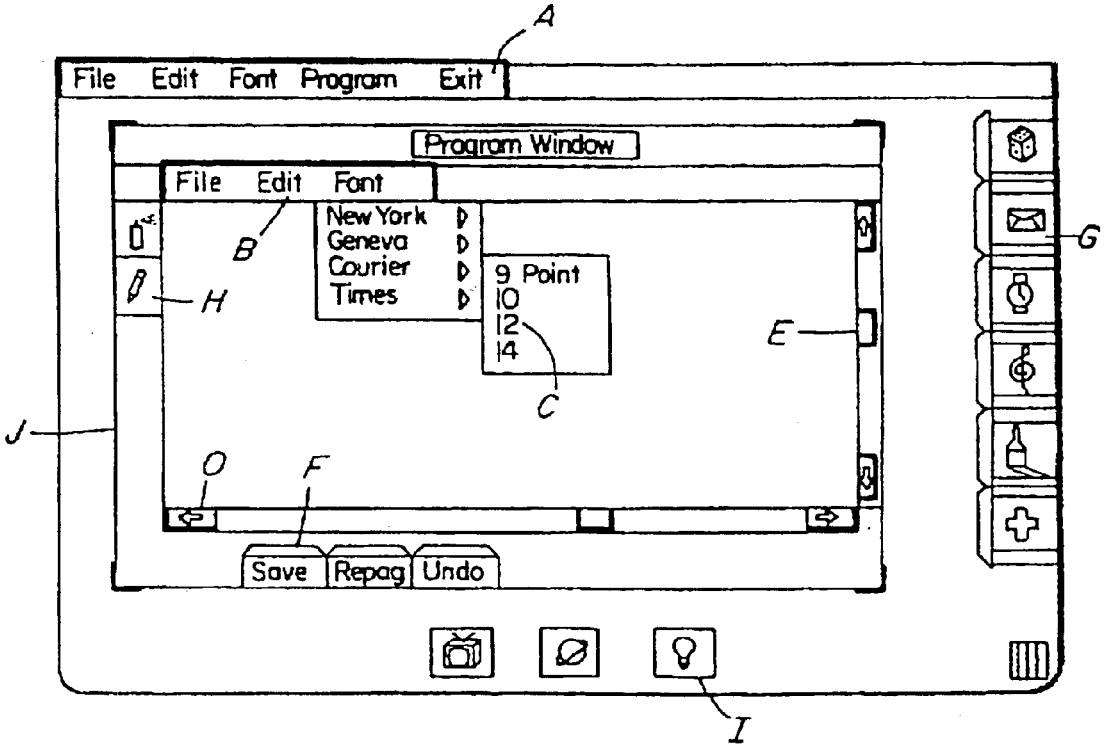
FIG. 12 is an illustration of a typical program window that would be shown on a model illustrated some of the applications to which the present invention may be applied.

FIG. 12 shows an example of a graphic user interface that could be augmented with tactile and kinesthetic interface using the present invention. The various lettered designations illustrate some of the features that may be obtained using the force feedback of the present invention.

A. The mouse may be programmed to constrain the cursor for movement along a straight edge.

B. indicates a menu bar that may be programmed as kinaesthetically stable place when it is approached from below so that the user can move the pointer rapidly in the direction of the menu bar from below and when it reaches the menu bar force feedback applied to the control handle to stop the motion of the controller and thus of the pointer.

The menu bar itself may be provided with bi-stable tactile elements to indicate when the pointer moves from one menu item to the next.

C. indicates a vertical menu. In this system the mouse could be set to permit the pointer to move only vertically up or down the menu.

D. The scroll bar shown at D may be supplemented with force feedback applied to the arrow used for the scrolling process by allowing the user to move faster and be more carefree when trying to position the pointer over the arrow. This can be done by creating forces at the sides on the arrow that prevent the pointer from overshooting, i.e. it would impede the mouse as it moves across the arrow.

The force feedback system could be also be used to actuate the computer rather than the button or switch mounted on the handle EG.switch 20. The mouse would simulate a button press in its transmission to the computer whenever the force with which the user pushes against one of the sides of the arrow exceeds a threshold.

E. shows a thumb type scroll bar which is similar to the arrow type scroll bar and to which force feedback could be applied to form a stable position in the bar and prevent the pointer from overshooting and constrain the pointer from going beyond the thumb opening. After the pointer is in position within the thumb opening pressing the pointer against the top or bottom of the thumb opening, the thumb would follow the motion of the pointer.

Furthermore, as the thumb is moved a damping force could be added and the motion direction, giving the user feedback in the form of a viscous drag sensation and when the thumb has reached the limit of its range appropriate force could be applied to the handle.

F. Command Soft button manipulatable by movement of the pointer or curse to initiate command i.e. soft buttons that may be pressed by the pointer and the tactile sense of pressing a button transferred back to the controller handle so that the feel of pressing a button.

G. shows further examples of soft buttons that could be used in a manner similar to icons and incorporate in the software a force gravitational scheme to facilitate user arriving at the button.

H. shows tactile regions wherein examples of specific tools may be selected The use of a bi-stable tactile feedback system could be employed to make user selection of the desired tool more quick and accurate.

I. indicates a system wherein gravitational force may be applied to draw the cursor pointer to the icon when it comes within a certain preselected distance of the icon.

J. demonstrates a window boundary wherein force feedback would be designed to prevent the pointer or cursor from traversing such a boundary or apply force when the window is entered or exited.

It will be apparent that by programming, control of the power of the coils 90, 122 and 156 may be accomplished making it possible to apply any desired force feedback to the handle, i.e. the position of the handle corresponds with the position of the pointer which provides the necessary information to apply force feedback coordinated with the position of the pointer on the monitor.

The coils 90 throughout description have been defined as having their longitudinal axes mutually perpendicular which is the preferred arrangement, but it will be apparent with appropriate software modification it is possible to arrange the coils differently i.e. so their axes extend in different directions that are neither parallel nor perpendicular.

Having described the invention, modifications will be evident to those skilled in the art without departing from the spirit of the invention as defined in the appended claims.

We claim:

[1. A controller comprising a base, a platform, means for mounting said platform for a range of movement in a plane in each of two different directions, a first magnetic force applying means including a first magnet means mounted on said base and a first cooperating magnetic force generating means mounted on and moveable with said platform in position to interact with said first magnet means, a second magnetic force applying means including a second magnet means mounted on said base and a second cooperating magnetic force generating means mounted on and moveable with said platform in a position to interact with said second magnet means, said first and said second magnet means being fixed relative to each other on said base and said first and said second cooperating magnet force generating means being fixed relative to each other on said platform, said first force applying means being positioned and constructed to controllably apply selected forces to said platform in one of said two different directions and said second force applying means being constructed and positioned to controllably apply selected forces to said platform in the other of said two different directions and control means to selectively control said first and said second force applying means to generate said selected forces.]

[2. A controller as defined in claim 1 wherein said two directions are mutually perpendicular.]

[3. A controller as defined in claim 1 further comprising a sensor means for sensing the position of said platform relative to said base.]

[4. A controller as defined in claim 3 wherein said sensor means comprises a transparent grid mounted on and moveable with said platform and a light source and a detector means fixed relative to said base in positions wherein light from said source passes through said grid and is detected by said detector means.]

[5. A controller as defined in claim 2 further comprising a sensor means for sensing the position of said platform relative to said base.]

[6. A controller as defined in claim 5 wherein said sensor means comprises a transparent grid mounted on and moveable with said platform and a light source and a detector means fixed relative to said base in positions wherein light from said source passes through said grid and is detected by said detector means.]

[7. A controller as defined in claim 2 wherein said first cooperating magnet force generating means including a first coil means position to interact with said first magnet means when a current is applied to said first coil means, and said second magnetic force generating means including a second cooperating coil means in a position to interact with said second magnet means when a current is applied to said second coil means, said first magnet means and said first cooperating coil means of said first force applying means being shaped and positioned so that in any position of said platform within said range said coil may be controlled to apply said selected forces between each of said first and second cooperating coil means and its respective magnet means and wherein said control means selectively applies current to said first and said second cooperating coil means to generate said selected forces.]

[8. A controller as defined in claim 7 wherein the projected area of a field generated by said first magnet means onto said first cooperating coil means is substantially constant so that the application of a selected current to said first cooperating coil means generates the same force between said first magnet means and said first cooperating coil means regardless of the position of said platform within said range of movement, said second magnet means and said second cooperating coil means of said second force applying means being shaped and positioned so that in any position of said platform within said range the projected area of a field generated by said second magnet means onto said second cooperating coil means is substantially constant so that the application of a selected current to said second cooperating coil means generates the same force between said second magnet means and said second cooperating coil means regardless of the position of said platform within said range.]

[9. A controller as defined in claim 8 wherein said first cooperating coil means comprises a first elongated substantially planar coil having its major axis extending substantially parallel to said plane and to one of said pair of mutually perpendicular directions and said second cooperating coil means comprises a second elongated substantially planar coil having its major axis substantially parallel to said plane and said other of said mutually perpendicular directions.]

[10. A controller as defined in claim 5 wherein said first cooperating magnet force generating means including a first coil means position to interact with said first magnet means when a current is applied to said first coil means, and said second magnetic force generating means including a second cooperating coil means in a position to interact with said second magnet means when a current is applied to said second coil means, said first magnet means and said first cooperating coil means of said first force applying means being shaped and positioned so that in any position of said platform within said range said coil may be controlled to apply said selected forces between each of said first and second cooperating coil means and its respective magnet means and wherein said control means selectively applies current to said first and said second cooperating coil means to generate said selected forces.]

[11. A controller as defined in claim 10 wherein the projected area of a field generated by said first magnet means onto said first cooperating coil means is substantially constant so that the application of a selected current to said first cooperating coil means generates the same force between said first magnet means and said first cooperating coil means regardless of the position of said platform within said range of movement, said second magnet means and said second cooperating coil means of said second force applying means being shaped and positioned so that in any position of said platform within said range the projected area of a field generated by said second magnet means onto said second cooperating coil means is substantially constant so that the application of a selected current to said second cooperating coil means generates the same force between said second magnet means and said second cooperating coil means regardless of the position of said platform within said range.]

[12. A controller as defined in claim 11 wherein said first cooperating coil means comprises a first elongated substantially planar coil having its major axis extending substantially parallel to said plane and to one of said pair of mutually perpendicular directions and said second cooperating coil means comprises a second elongated substantially planar coil having its major axis substantially parallel to said plane and said other of said mutually perpendicular directions.]

[13. A controller as defined in claim 6 wherein said first cooperating magnet force generating means including a first coil means position to interact with said first magnet means when a current is applied to said first coil means, and said second magnetic force generating means including a second cooperating coil means in a position to interact with said second magnet means when a current is applied to said second coil means, said first magnet means and said first cooperating coil means of said first force applying means being shaped and positioned so that in any position of said platform within said range said coil may be controlled to apply said selected forces between each of said first and second cooperating coil means and its respective magnet means and wherein said control means selectively applies current to said first and said second cooperating coil means to generate said selected forces.]

[14. A controller as defined in claim 13 wherein the projected area of a field generated by said first magnetic means onto said first cooperating coil means is substantially constant so that the application of a selected current to said first cooperating coil means generates the same force between said first magnet means and said first cooperating coil means regardless of the position of said platform within said range of movement, said second magnet means and said second cooperating coil means of said second force applying means being shaped and positioned so that in any position of said platform within said range the projected area of a field generated by said second magnet means onto said second cooperating coil means is substantially constant so that the application of a selected current to said second cooperating coil means generates the same force between said second magnet means and said second cooperating coil means regardless of the position of said platform within said range.]

[15. A controller as defined in claim 14 wherein said first cooperating coil means comprises a first elongated substantially planar coil having its major axis extending substantially parallel to said plane and to one of said pair of mutually perpendicular directions and said second cooperating coil means comprises a second elongated substantially planar coil having its major axis substantially parallel to said plane and said other of said mutually perpendicular directions.]

[16. A controller as defined in claim 9 wherein said first magnet means and said second magnet means each comprises a pair of permanent magnet means, one permanent magnet means of each said pair located on one side of its said cooperating coil means and the other permanent magnet means of each said pair of permanent magnet means located on the side of its said cooperating coil means opposite its respective said one permanent magnet means.]

[17. A controller as defined in claim 16 wherein each said permanent magnet means comprises a pair of permanent magnets arranged in spaced parallel relationship with their magnetic poles facing in opposite directions and with their polar axes substantially parallel to the plane of said planar coils.]

[18. A controller as defined in claim 17 wherein said polar axis of each said permanent magnet means is substantially parallel to said major axis of its respective cooperating planar coil.]

*19. An interface device for enabling a user to spatially navigate a displayed graphical menu with a displayed graphical pointer, said graphical menu having a plurality of menu elements, and for enabling said user to more easily select a menu element from said graphical menu be providing tactile feedback to said user when said graphical pointer is moved from a first menu element to a second menu element in said graphical menu, said interface device comprising:*

*(a) a handle to be manipulated manually by a user in at least two planar degrees of freedom;*

*(b) a z-axis actuator generating tactile sensations to be felt by said user, wherein said z-axis actuator applies forces to a user's hand only along a z-axis degree of freedom when current is flowed through a portion of said actuator, said z-axis degree of freedom being different from and substantially perpendicular to said two planar degrees of freedom;*

*(c) a sensor that produces a locative signal responsive to and corresponding with a motion of said handle in said at least two degrees of freedom;*

*(d) a button that produces a status signal in response to being pressed by said user; and*

*(e) an embedded microprocessor local to said interface device and coupled to said sensor, to said button, and to said actuator, said microprocessor performing:*

*sending handle movement data and button data to a host computer over a communication bus such that said host computer can update displayed pointer locations with respect to said displayed graphical menu,*

*receiving desired force values from said host computer, said desired force values correlated with particular pointer locations displayed by said host computer, and*

*controlling said z-axis actuator in accordance with said received desired force values so as to provide said tactile sensations to said user that are correlated with a location of said displayed graphical pointer displayed within said graphical menu.*

*20. An interface device as recited in claim 19 wherein said z-axis actuator imparts, said tactile sensations upon said handle along a z-axis orthogonal to said at least two planar degrees of freedom.*

*21. An interface device as recited in claim 19 wherein said handle is physically coupled to a support mechanism that is grounded and allows linear displacement between said handle and an origin.*

*22. An interface device as recited in claim 21 wherein said z-axis actuator is a flat coil actuator.*

*23. An interface device as recited in claim 22 wherein a magnet associated with said flat coil actuator is fixed with respect to said origin and wherein said flat coil actuator moves with respect to said origin.*

*24. An interface device as recited in claim 19 wherein said sensor is an optical sensor that includes an emitter and a detector.*

*25. An interface device as recited in claim 24 wherein said emitter moves when said handle is moved, projecting light upon said detector.*

*26. An interface device as recited in claim 25 wherein said detector detects motion of said emitter in two mutually perpendicular directions.*

*27. An interface device as recited in claim 19 further comprising a memory that stores values that are representative of a location of an image displayed by said host computer.*

*28. An interface device as recited in claim 27 wherein said location includes a location of an icon displayed by said host computer.*

*29. An interface device as recited in claim 19 wherein said handle is a joystick.*

*30. An interface device as recited in claim 19 wherein said handle is a mouse.*

*31. An interface device as recited in claim 19 wherein said embedded microprocessor receives display information from said host computer over said communication bus.*

*32. An interface device as recited in claim 19 wherein said tactile sensations include a viscous drag force.*

*33. An interface device as recited in claim 19 wherein said tactile sensations include an attractive force.*

*34. An interface device as recited in claim 34 wherein said attractive force is used to assist a user in positioning said displayed graphical pointer into said displayed graphical menu.*

*35. An interface device as recited in claim 19 wherein said embedded microprocessor receives code over a communication bus from said host computer and executes said code, said communication bus including a serial interface bus.*

*36. A device for use in conjunction with a host computer including a computer display, said host computer displaying a graphical environment including a displayed graphical pointer controlled by a user, said device comprising:*

*a handle to be manipulated manually by said user in at least two planar degrees of freedom;*

*a z-axis actuator to generate a tactile sensation to be felt by said user, said z-axis actuator applying forces to a hand of said user only along a z-axis degree of freedom when current is flowed through a portion of said z-axis actuator, said z-axis degree of freedom being different from and substantially perpendicular to said at least two planar degrees of freedom;*

*a sensor that produces a locative signal responsive to and corresponding with a position or motion of said handle in said at least two planar degrees of freedom;*

*a button that produces a status signal in response to being pressed by said user; and*

*a control electronics local to said device and coupled to said sensor and said actuator and said button, said control electronics performing the following:*

*sending handle movement data and button data to said host computer over a communication bus such that said host computer can update a displayed pointer location in said displayed graphical environment,*

*receiving a force value from said host computer, said force value correlated with said updated displayed pointer location, and*

*controlling said z-axis actuator in accordance with said received force value so as to provide said tactile sensation to said user that is correlated with a location of said displayed graphical pointer displayed within said displayed graphical environment.*

*37. A device as recited in claim 36 wherein said control electronics include an embedded microcontroller.*

*38. A device as recited in claim 37 wherein said embedded microcontroller runs a program contained, at least in part, in a memory coupled to said embedded microcontroller, and wherein said memory also stores location information which corresponds with image data from a computer display coupled to said host computer.*

*39. A device as recited in claim 38 wherein said location information includes information relating to a location of an icon on said graphical display.*

*40. A device as recited in claim 38 wherein said location information includes information relating to a location of a window on said graphical environment.*

*41. A device as recited in claim 38 wherein said location information includes information related to a location of a graphical button on said graphical environment.*

*42. A device as recited in claim 38 wherein said graphical environment includes a cursor interacting with another object displayed on said computer display.*

*43. A device as recited in claim 42 wherein said cursor interacts with an icon image displayed on said computer display.*

*44. A device as recited in claim 36 wherein said at least two planar degrees of freedom are linear degrees of freedom.*

*45. A device as recited in claim 36 wherein said control electronics calculates force feedback forces based on commands received from said host computer.*

*46. A device as recited in claim 36 wherein said handle is moveable in a plane.*

*47. A device as recited in claim 46 wherein said handle is also moveable along a z-axis that is approximately perpendicular to said plane.*

*48. A device as recited in claim 36 wherein said tactile sensation is applied to correspond with said displayed pointer interacting with a displayed graphical menu to enable said user to more easily select a menu item from said displayed graphical menu by providing tactile feedback to said user when said displayed graphical pointer is moved from one menu item to a next menu item in said graphical menu.*

*49. A device as recited in claim 36 wherein said tactile sensation is applied to correspond with said displayed pointer interacting with a displayed button.*

*50. A device as recited in claim 36 wherein said tactile sensation is applied to correspond with said displayed pointer interacting with a displayed window.*

*51. A device as recited in claim 36 wherein said tactile sensation is applied to correspond with said displayed pointer interacting with a displayed icon.*

*52. An interface device for use with a host computer displaying a graphical application on a display device, said host computer displaying, executing, and updating graphical objects in a graphical environment in response to user manipulation of said interface device and commanding force feedback sensations in response to said user manipulation and in coordination with said graphical objects, said graphical objects including a graphical pointer, said interface device comprising:*

*a physical object grasped and manipulatable by a user in two planar degees of freedom;*

*at least one z-axis actuator coupled to said physical object for receiving a force control signal and imparting forces along at least one degree of freedom of said physical object and in accordance with said force control signal, said forces applied along a z-axis degree of freedom that is different from and substantially perpendicular to said two planar degrees of freedom;*

*a sensor that detects motion of said physical object along said at least one degree of freedom and outputs signals relating to a position of said physical object;*

*a user-adjustable switch apparatus providing a state signal representing a state of said user-adjustable switch apparatus; and*

*a microprocessor local to said interface device, separate from said host computer, and coupled to said host computer, to said sensor, and to said switch apparatus, said microprocessor receiving*

*force values from said host computer, said force values correlated with particular locations of said graphical pointer in said graphical environment displayed by said host computer,*

*said state signal from said user-adjustable switch apparatus, and*

*said signals from said sensor,*

*said microprocessor executing a process in parallel with said displaying, executing, and updating graphical objects and providing said force control signal to said at least one z-axis actuator to impart said forces in accordance with said force values so as to provide tactile sensations to said user that are correlated with a location of said displayed graphical pointer.*

*53. The interface device as recited in claim 52 wherein said graphical objects include a displayed graphical menu, wherein said tactile sensations enable said user to more easily select a menu element from said displayed graphical menu by providing said tactile sensations to said user when said graphical pointer is moved from one menu element to a next menu element in said displayed graphical menu.*

*54. A method for controlling a force feedback interface device using a host computer, said force feedback interface device manipulated by a user, a display device coupled to said host computer displaying a graphical user interface including images and updating said graphical user interface in response to said manipulation of said force feedback interface device, said force feedback interface device conveying force feedback sensations to said user in response to said manipulations, said method comprising:*

*sending a position signal to said host computer, said position signal including information representative of a motion or position of a handle of said force feedback interface device in two planar degrees of freedom, said handle being physically manipulated by said user, wherein said host computer updates a location of a cursor within said graphical user interface in response to said position signal;*

*receiving a force value from said host computer with a microprocessor local to said force feedback interface device, said force value correlated with said location of said cursor; and*

*controlling a z-axis actuator in accordance with said received force value to provide a tactile sensation to said user that is correlated with said location of said cursor in said graphical user interface, said tactile sensation being applied to a hand of said user along a z-axis degree of freedom, said z-axis degree of freedom being different from and substantially perpendicular to said two planar degrees of freedom.*

*55. A method as recited in claim 54 wherein a sensor signal is input to said microprocessor, said microprocessor calculating said position signal based on said sensor signal, said microprocessor sending said position signal to said host computer.*

*56. A method as recited in claim 54 wherein said handle includes a joystick that can be moved by said user in two degrees of freedom.*

*57. A method as recited in claim 55 wherein said graphical user interface provides graphical objects for interfacing with an application program running on said host computer, said graphical objects including an icon, a window, and a menu.*

*58. A human-computer interface device for controlling a graphical cursor displayed by a host computer and for providing tactile feedback to a user in accordance with displayed interactions between said graphical cursor and other graphical objects displayed by said host computer, said interface device comprising:*

*a physical object to be moved by a user in two planar degrees of freedom;*

*one or more sensors that produce a locative signal responsive to and indicative of a position of said physical object in said two planar degrees of freedom;*

*a x-axis actuator that applies force to a hand of said user only along a z-axis degree of freedom when current is flowed through a portion of said z-axis actuator, said z-axis degree of freedom being different from and substantially perpendicular to said two planar degrees of freedom; and*

*a microprocessor separate from and in communication with said host computer, said microprocessor coupled to said one or more sensors and to said z-axis actuator, wherein said microprocessor receives desired force values from said host computer, said desired force values correlated with particular pointer locations displayed by said host computer, said microprocessor controlling current through said portion of said actuator in accordance with said desired force values.*

*59. An interface device as recited in claim 58 wherein said two planar degrees of freedom are x and y axes parallel to a flat surface on which said interface device rests and said z-axis degree of freedom is substantially perpendicular to said x and y axes.*

*60. An interface device as recited in claim 58 wherein said interface device is a mouse device and wherein said physical object is a mouse.*

*61. An interface device as recited in claim 58 wherein said z-axis actuator includes a wire coil through which said current is flowed.*

*62. An interface device as recited in claim 61 wherein said z-axis actuator includes a magnet core.*

*63. An interface device as recited in claim 62 wherein said magnet core is an E-core.*

*64. An interface device as recited in claim 62 further comprising a permanent spring coupled between said physical object and said actuator.*

*65. An interface device as recited in claim 58 wherein said one or more sensors is an optical encoder.*

*66. An interface device as recited in claim 65 wherein said one or more sensors is an encoder.*

*67. An interface device as recited in claim 58 wherein said z-axis actuator is controlled to indicate when said graphical cursor displayed by said host computer is moved from one displayed menu element to another displayed menu element.*

*68. An interface device as recited in claim 58 wherein said z-axis actuator is controlled to indicate when said graphical cursor displayed by said host computer crosses a window boundary.*

*69. An interface device as recited in claim 58 wherein said z-axis actuator is controlled to apply said force to said hand to indicate when said graphical cursor displayed on said host computer is positioned over a graphical element.*

*70. An interface device as recited in claim 58 wherein said actuator includes a portion that is moveable by said user along a z-axis control to said host computer.*

*71. An interface device as recited in claim 58 wherein a physical tactile element is physically coupled to said actuator and is moved to contact and apply pressure to said hand.*

*72. An interface device as recited in claim 71 wherein said physical tactile element applies pressure upon said hand by pressing upward on said hand when said current is flowed through said portion of said z-axis actuator.*

* * * * *

UNITED STATES PATENT AND TRADEMARK OFFICE

CERTIFICATE OF CORRECTION

PATENT NO. : RE 40,341 E
APPLICATION NO. : 09/307023
DATED : May 27, 2008
INVENTOR(S) : Septimiu Edmund Salcudean et al.

It is certified that error appears in the above-identified patent and that said Letters Patent is hereby corrected as shown below:

Page 3, second reference, first column, phrase "ANS Topical Mfg." should read --ANS Topical Mtg.--
Page 4, second reference, second column, word "Demonsdtrator" should read --Demonstrator--
Page 4, fourth reference, second column, word "Bullein" should read --Bulletin--
Column 13, Line 44, phrase "said host computer," should read --said host computer;--
Column 18, Line 14, phrase "is an optical encoder" should read --is an optical sensor--
Column 2, Line 24, phrase "said detector means" should read --said detector means.--
Column 3, Line 15, word "means" should read --means.--
Column 4, Line 15, phrase "end of mounting bar 44 and 46" should read --end of mounting bars 44 and 46--
Column 4, Line 28, word "platform'" should read --platform--
Column 9, Line 65, phrase "may be selected The use of" should read --may be selected. The use of--

Signed and Sealed this

Third Day of March, 2009

JOHN DOLL
*Acting Director of the United States Patent and Trademark Office*